(No Model.)
W. G. BOLUS.
CULINARY UTENSIL.
No. 554,048. Patented Feb. 4, 1896.
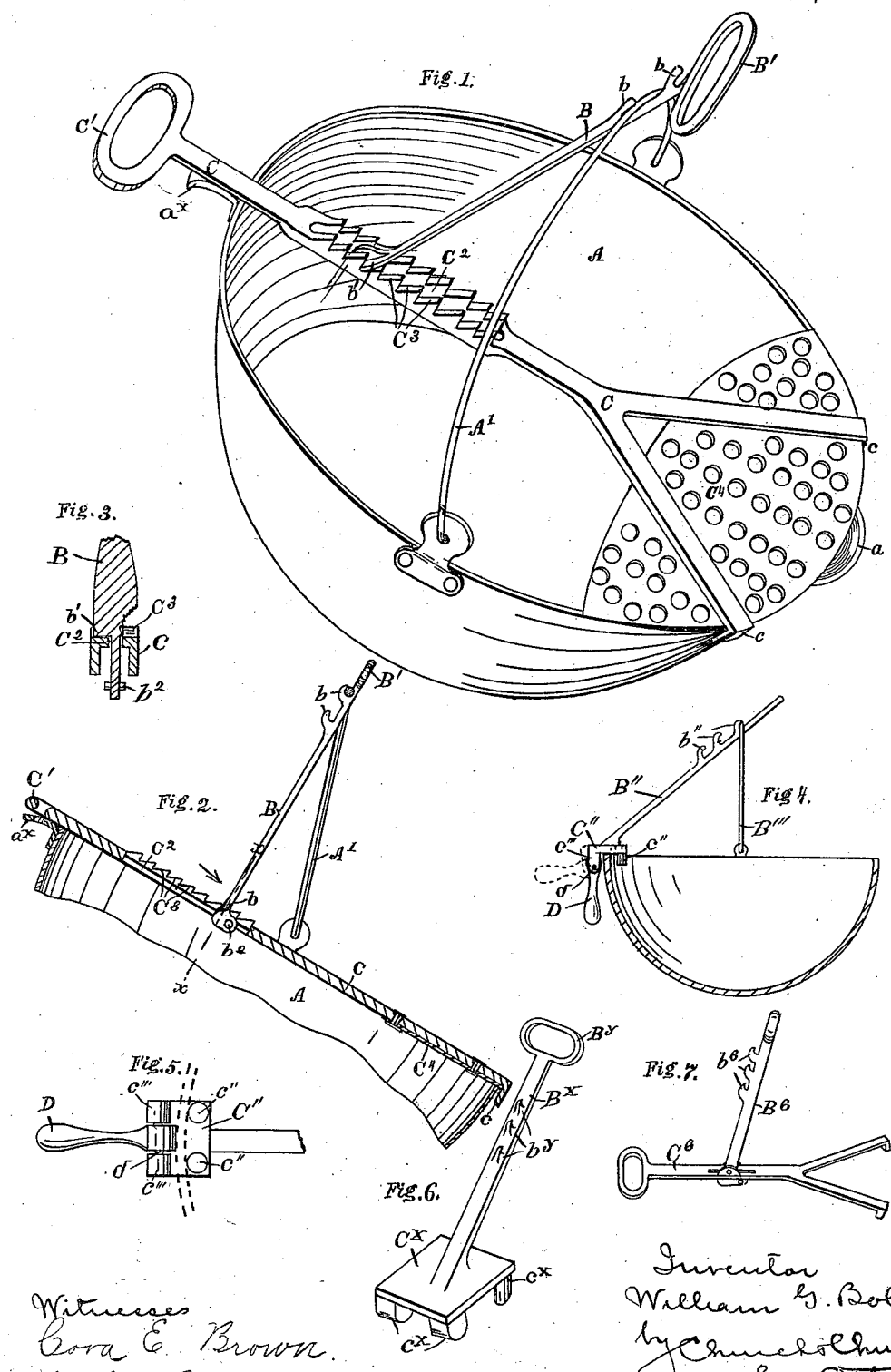
Witnesses
Cora E. Brown.
M. F. W. Church
Inventor
William G. Bolus.
by Church & Church
his Attys

UNITED STATES PATENT OFFICE.

WILLIAM G. BOLUS, OF ROCHESTER, NEW YORK, ASSIGNOR, BY DIRECT AND MESNE ASSIGNMENTS, OF TWO-THIRDS TO SARAH JANE CUSHMAN AND ADELINE E. CARPENTER, OF SAME PLACE.

CULINARY UTENSIL.

SPECIFICATION forming part of Letters Patent No. 554,048, dated February 4, 1896.

Application filed June 20, 1895. Serial No. 553,441. (No model.)

*To all whom it may concern:*

Be it known that I, WILLIAM G. BOLUS, of Rochester, in the county of Monroe and State of New York, have invented certain new and useful Improvements in Culinary Utensils; and I do hereby declare the following to be a full, clear, and exact description of the same, reference being had to the accompanying drawings, forming a part of this specification, and to the reference-letters marked thereon.

Heretofore considerable difficulty has been experienced by the housewife in successfully pouring, while hot, the water or liquor from a pot, kettle, or other receptacle having a swinging bail or handle, and at the same time retain the solid or semisolid contents, owing to the difficulty of maintaining the proper relation of the handle or bail and the front and rear of the kettle or pot; and my invention therefore has for its object to provide a device which can be applied to any ordinary pot or kettle having a bail by the use of which the pouring can be accomplished without liability of spilling the contents, or of the operator's being burned or scalded by contact with the hot receptacle or its contents, and, if desired, the same device serves to strain the liquid, retaining the solid contents, as potatoes, within the pot or kettle; and to these and other ends it consists in the improved utensil hereinafter described, the novel features being pointed out in the claims at the end of this specification.

In the drawings, Figure 1 is a perspective view of a kettle or similar receptacle, showing the manner of using my invention; Fig. 2, a longitudinal sectional view of the same; Fig. 3, a cross sectional view on the line $x\ x$ of Fig. 2; Figs. 4 and 5, a longitudinal section and a bottom plan view of a modification, and Figs. 6 and 7 perspective views of other modifications.

Similar reference-letters in the several figures indicate similar parts.

The utensil forming the subject-matter of my present invention embodies a member or part adapted to engage one side of the kettle or receptacle and a member connected thereto, preferably by a pivotal connection, and adapted to engage the ordinary swinging bail or handle to maintain it above the kettle and prevent swinging backward as the kettle is tilted in pouring, so that the receptacle is supported by a substantially rigid (as far as backward motion is concerned) bail and may be tilted by an engaging portion in rear thereof, either on the kettle or temporarily located in this position. Though several modifications of this arrangement are shown herein, I prefer the construction illustrated in Figs. 1, 2 and 3 of the drawings, in which A indicates a pot or kettle of the ordinary construction having a bail or handle A' and a pouring spout or edge $a$; B, one member of the utensil constituting the bail-support, preferably having a handle B' at its upper end and two or more lugs or projections $b$ on the rear side for engaging the bail A' and preventing its backward motion.

C indicates the other member of the attachment adapted to engage the kettle, made in the form of a plate, rod or casting, and bifurcated at its forward end and provided with lugs $c$, engaging the front edge of the kettle on opposite sides of the pouring-spout $a$. The rear end of this member is provided with a handle C', and the member B is connected to it intermediate its ends by a pivotal connection, preferably adjustable, and formed by providing a slot $C^2$ in the member C, and ratchet-teeth $C^3$ on the upper side on one or both sides of said slot with which a projection or tooth $b'$ on the member B engages, a cross-pin $b^2$ on the end of the member B engaging the under side of the member C, as shown in Fig. 3. A piece of perforated metal or other foraminous material $C^4$ is attached to the bifurcated forward end and serves as a strainer for preventing the solid contents of the kettle from escaping in pouring, but permitting the escape of the liquid.

The manner of using the device will be apparent, as it is only necessary to place the member C across the top of the kettle, with the member B beneath the bail, and then to raise the bail engaging it with one or the other of the lugs $b$ (depending on the height of the bail) and sliding the member B forward and causing the tooth $b'$ thereon to engage the tooth $C^3$ that will insure the proper position of the bail relative the top of the kettle to enable the contents to be poured to the best advantage. Considerable latitude may be permitted in this adjustment; but it is desirable that the point of connection between the two members B and C be near the pivotal point of the bail, though not sufficiently forward of it to allow the bail to tip back, so that the center of gravity will be low when pouring.

The provision of the handles B' and C' on the members is advisable, as it obviates the necessity of touching the vessel A, which is in use very hot, and also the accidental displacement of the parts is prevented in use; but this I do not regard as essential. The adjustment of the parts B and C relatively is also advisable, as it permits the device to be used on vessels of different diameter, and by providing several lugs b' vessels having bails of different heights may be operated upon.

In Figs. 4 and 5 I have shown a modification of the device, in which the bail-engaging member B" is provided with a handle B"' and a series of lugs b" for engaging the bail, said member being attached rigidly to a plate C" having lugs c" engaging the inner side of the rear of the kettle and lugs c"' engaging the outer rear side, D indicating a handle in the form of a clamping-lever pivoted at d to plate C" and adapted when lifted to clamp said plate to the kettle, which may then be lifted by the handles D and B"' and the contents poured.

In Fig. 6 I have shown a bail-supporting member $B^x$ having a handle $B^y$ and lugs $b^y$ formed with or attached to a plate $C^x$ having lugs $c^x$ for engaging the rear edge of the kettle. In this construction the kettle is to be tilted by the ordinary lug or handle $a^x$ thereon, as may the kettle shown in Fig. 1, if desired.

In Fig. 7 a further modification is shown, in which the members $C^6$ and $B^6$ are pivoted together, the adjustment for different sizes being accomplished by the provision of a series of lugs $b^6$ on the member $B^6$.

Though these modifications could be used without departing from my invention, I much prefer the arrangement first described, as it is cheaply and easily constructed, is adjustable for various sizes of vessels, and is absolutely reliable in use, and, further, enables a strainer to be used, which is eminently desirable, though this could be used also in the modification in Fig. 7.

I claim as my invention—

1. As a new article of manufacture, a pouring device for vessels having bails, composed of one member adapted to engage the rear edge of the vessel, and a bail-supporting member extending upwardly therefrom in use, and provided with an engaging portion for co-operating with the bail and preventing backward movement when the vessel is tilted to pour, substantially as described.

2. As a new article of manufacture, a pouring device for vessels having bails, composed of a member having a handle and adapted to engage the rear edge of the vessel, and a bail-supporting member extending upwardly therefrom in use, and provided with an engaging portion for co-operating with the bail and preventing backward movement when the vessel is tilted to pour, substantially as described.

3. As an article of manufacture, a pouring device for vessels having bails, composed of a member having a handle, and adapted to engage the rear edge of the vessel, and a bail-supporting member extending upwardly therefrom in use, provided with a handle and an engaging portion for co-operating with the bail and preventing backward movement when the vessel is tilted to pour, substantially as described.

4. As an article of manufacture, a pouring device for vessels having bails, composed of a member arranged to extend across the top of the vessel, and having engaging projections, a bail-supporting member pivoted to the first-mentioned one and having a handle and an engaging portion for co-operating with the bail and preventing backward movement when the vessel is tilted to pour, substantially as described.

5. As an article of manufacture, a pouring device for vessels having bails, composed of a member arranged to extend across the top of the vessel having engaging portions, and a strainer at one end, of a bail-supporting member pivoted to the first-mentioned one, and provided with an engaging portion for co-operating with the bail and preventing backward movement when the vessel is tilted to pour, substantially as described.

6. As an article of manufacture, a pouring device for vessels having bails, composed of a member arranged to extend across the top of the vessel and having projections for preventing longitudinal movement thereon, and a bail-supporting member pivoted to and adjustable longitudinally of said first-mentioned member having the handle and an engaging portion for co-operating with the bail and preventing backward movement when the vessel is tilted to pour, substantially as described.

7. As an article of manufacture, the pouring device for vessels having bails, composed of the member having the handle at one end, the lugs and strainer at the other, and the teeth intermediate the ends, the bail-supporting member connected to the other member to slide thereon, having the handle, the bail-engaging lug, and the projection engaging the teeth, arranged and operating substantially as described.

WILLIAM G. BOLUS.

Witnesses:
F. F. CHURCH,
G. A. RODA.